United States Patent [19]
Mason et al.

[11] Patent Number: 4,768,617
[45] Date of Patent: Sep. 6, 1988

[54] ADJUSTABLE STAIRWAY HAVING RETRACTABLE WHEEL CARRIAGE

[75] Inventors: John E. Mason, Owatonna; Herman A. Clausen, Blooming Prairie; Gary J. Lurken, Ellendale; Dale A. Sellner, Owatonna, all of Minn.

[73] Assignee: Wenger Corporation, Owatonna, Minn.

[21] Appl. No.: 74,412

[22] Filed: Jul. 16, 1987

[51] Int. Cl.[4] ............................................. E06C 1/397
[52] U.S. Cl. ............................................ 182/1; 182/17
[58] Field of Search ......................... 182/1, 17, 63, 127

[56] References Cited

U.S. PATENT DOCUMENTS

| | | | |
|---|---|---|---|
| 217,439 | 7/1879 | Zimmermann | 182/69 |
| 796,915 | 8/1905 | Ketchum | 182/204 |
| 2,362,170 | 11/1944 | Swaisgood | 182/17 |
| 2,512,150 | 6/1950 | Geren | 182/1 |
| 2,585,763 | 2/1952 | Gasner | 182/17 |
| 2,624,590 | 1/1953 | Tilton | 182/17 |
| 2,798,652 | 7/1957 | Easton | 182/17 |
| 2,969,123 | 1/1961 | Jamerson | 182/17 |
| 4,392,436 | 7/1983 | Weiler | 182/17 |

Primary Examiner—Reinaldo P. Machado
Attorney, Agent, or Firm—Dorsey & Whitney

[57] ABSTRACT

An adjustable stairway is disclosed that is supported on a retractable, wheel mounted carriage. A locking mechanism selectively maintains the carriage in a lowered, ground engaging position for easy maneuvering of the stairway. The weight of the stairway urges the carriage into a raised position when the locking mechanism is released, allowing the stairway to rest on stationary foot pads.

9 Claims, 3 Drawing Sheets

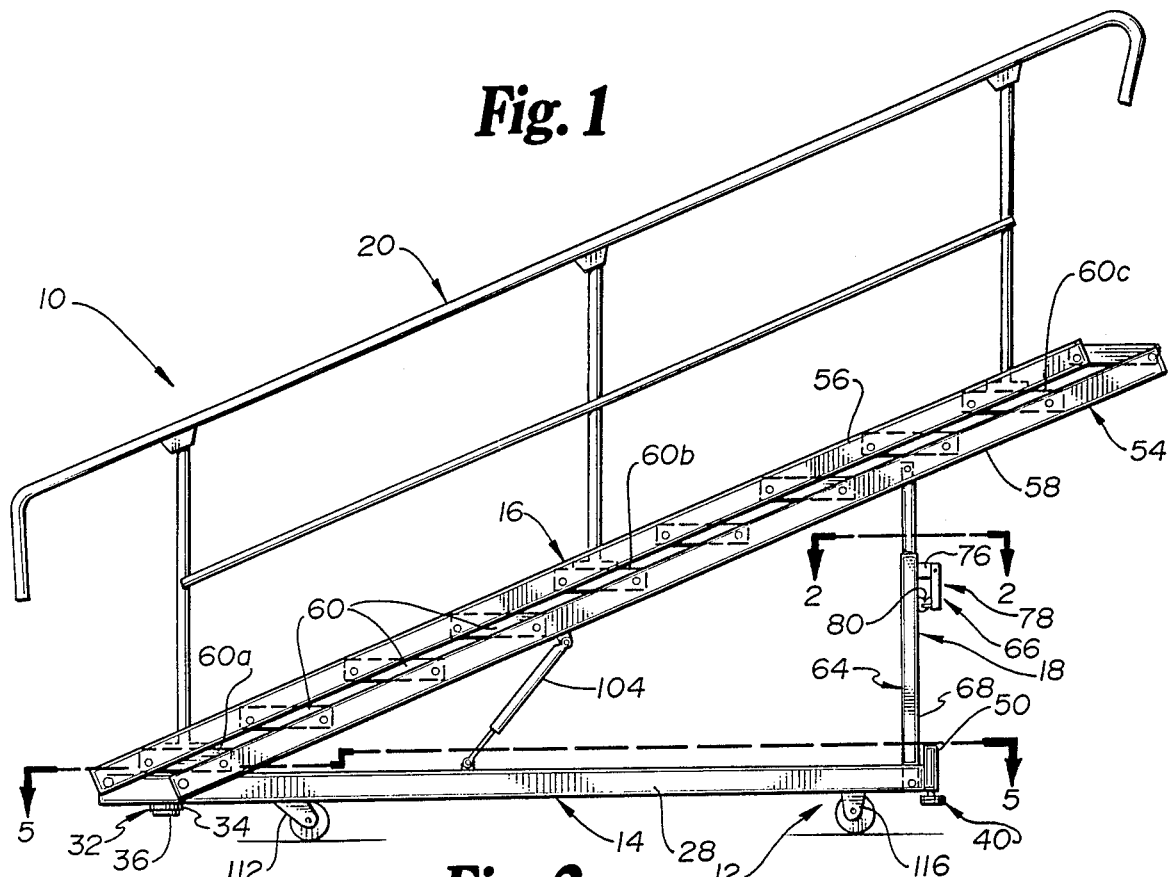
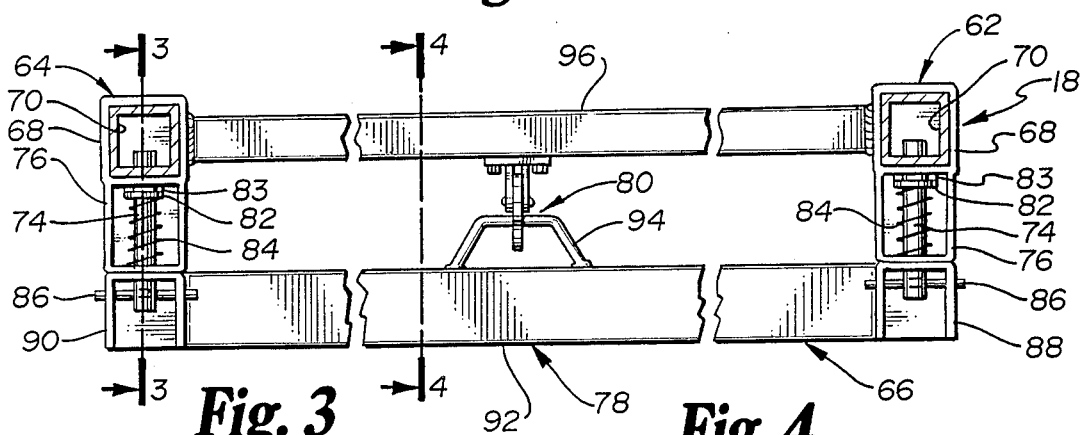
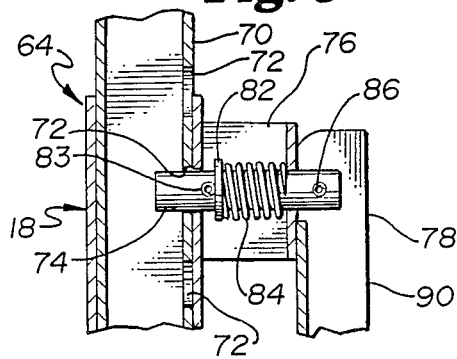
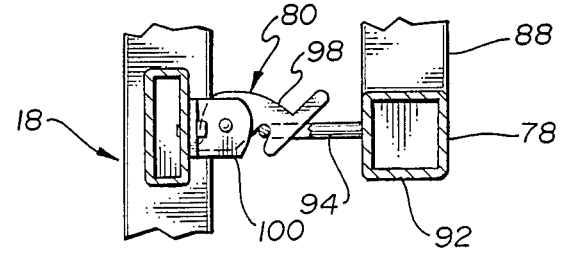

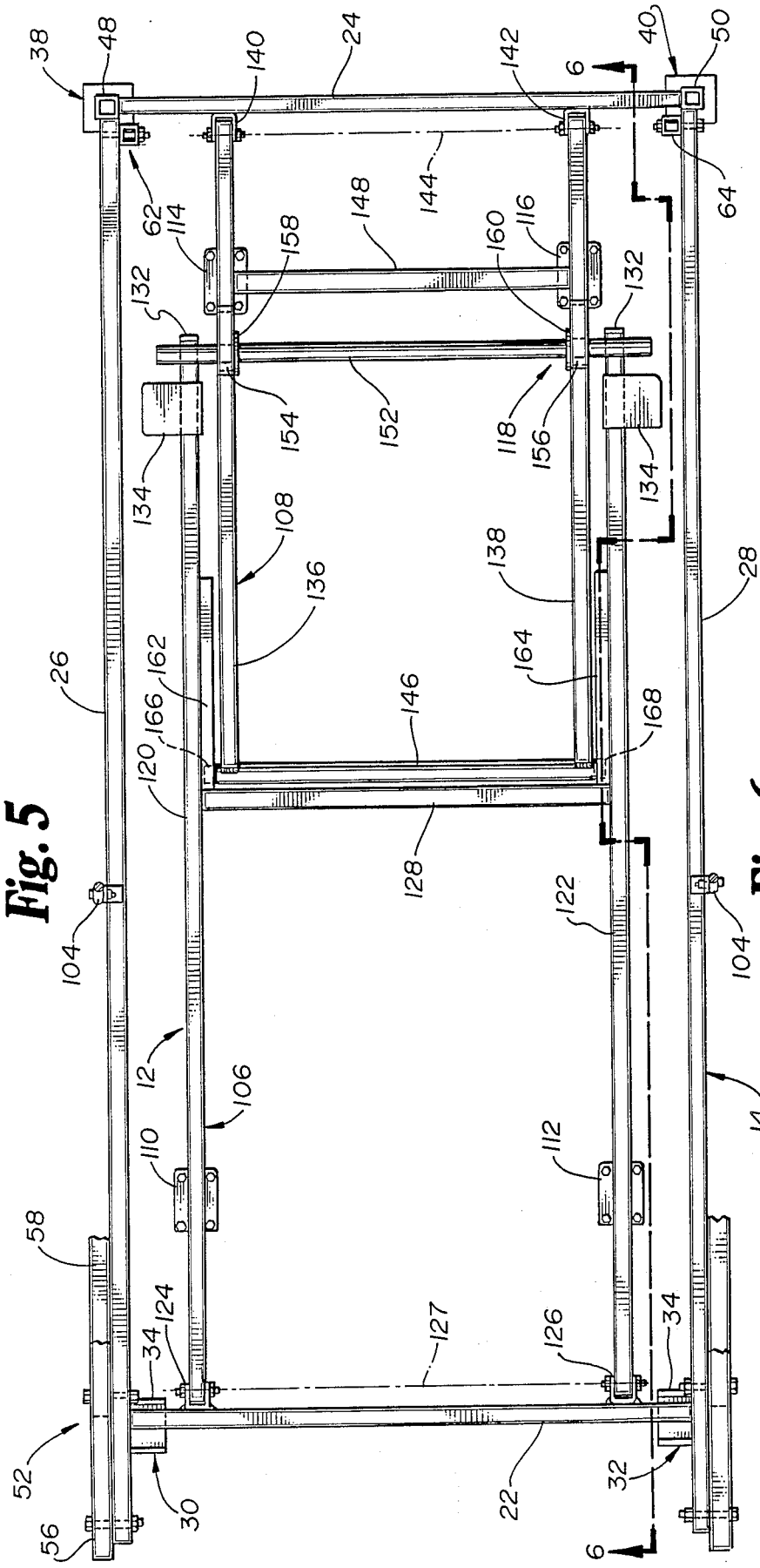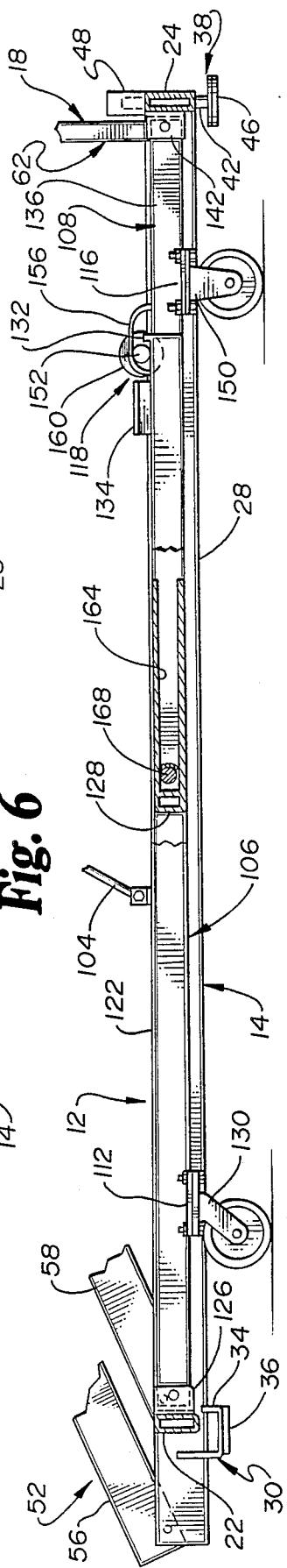

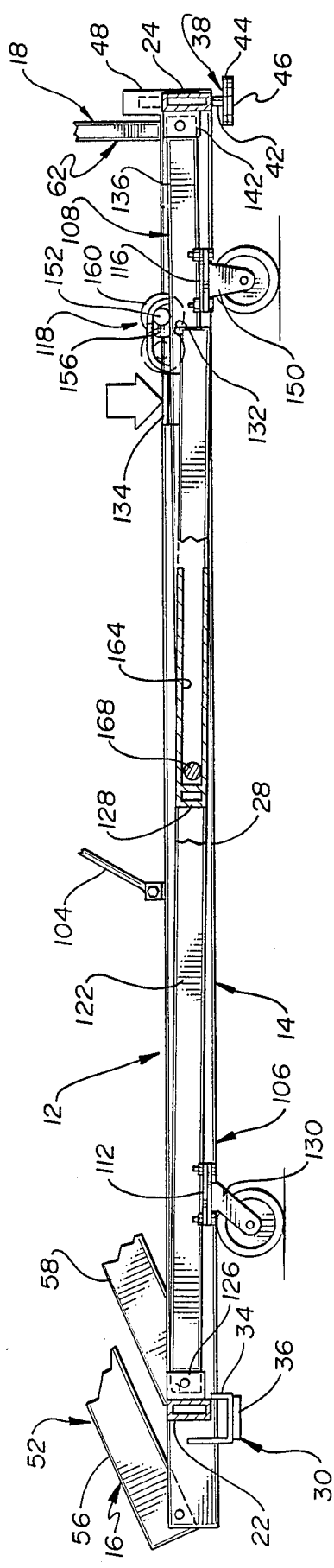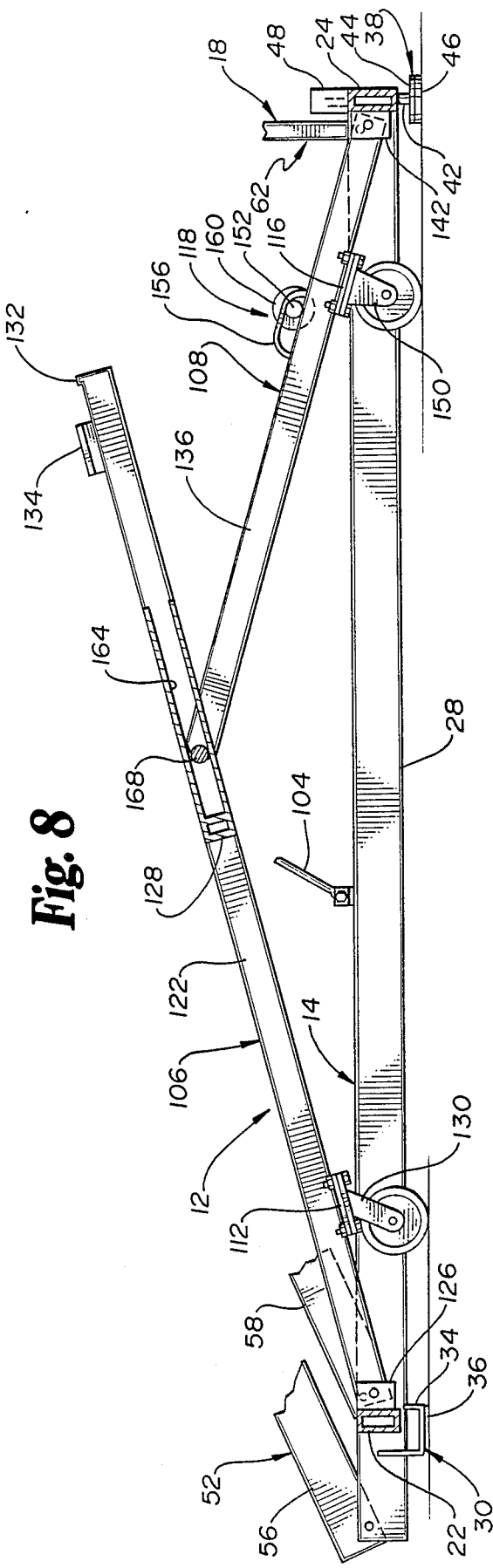

ADJUSTABLE STAIRWAY HAVING RETRACTABLE WHEEL CARRIAGE

TECHNICAL FIELD

This invention pertains to portable equipment. In particular, it pertains to an adjustable stairway having a retractable wheel carriage for selective support of the stairway on ground engaging wheels.

BACKGROUND OF THE INVENTION

Portable stage equipment has become the norm in the entertainment industry. Portable platforms, stairways, band shells, and the like, should be flexible and maneuverable for ease of setup, yet must have the capability to be firmly locked in place to provide a sturdy performance area. In particular, adjustable stairways that provide access to adjustable raised platforms should be easily maneuverable for proper alignment of the stairway with the raised adjustable platform during setup, yet must be sturdy and fixed in position once assembled as part of a stage to assure safe access to and from the raised platform.

SUMMARY OF THE INVENTION

An adjustable stairway is disclosed that includes a retractable wheel carriage that can be selectively raised and lowered to alternatively support the stairway on ground engaging wheels and stationary foot pads. Wheel assemblies are carried by carriage members that are pivotally coupled to the stairway support frame. The carriage members are coupled together along a shiftable pivot axis for simultaneous shifting of the wheel assemblies between lowered and raised positions. A locking mechanism is provided for selectively locking the carriage members and wheel assemblies in the lowered, ground engaging position.

BRIEF DESCRIPTION OF THE DRAWINGS

FIG. 1 is a side elevational view of an adjustable stairway having a retractable carriage in accordance with the present invention;

FIG. 2 is a fragmentary, sectional view taken along line 2—2 of FIG. 1;

FIG. 3 is a fragmentary, sectional view taken along line 3—3 of FIG. 2;

FIG. 4 is a fragmentary, sectional view taken along line 4—4 of FIG. 2;

FIG. 5 is a sectional view of the base of the adjustable stairway, taken along line 5—5 of FIG. 1;

FIG. 6 is a sectional view taken along line 6—6 of FIG. 5;

FIG. 7 is similar to FIG. 6, but with the retractable carriage shown in the lock release position; and FIG. 8 is similar to FIG. 6, but with the wheel assemblies in the raised position.

DETAILED DESCRIPTION

An adjustable stairway 10 having a retractable wheel carriage 12 is depicted in the drawings. Stairway 10 includes base frame 14, stair assembly 16, stair assembly telescoping support mechanism 18, and handrail 20.

Base frame 14 includes parallel, front and rear support bars 22, 24 rigidly connected by opposed side support bars 26, 28. Fixed foot pads 30, 32 are positioned at the intersection of front support bar 22 and side support bars 26, 28, respectively. The foot pads each include a pad support weldment 34 and an elastomeric pad 36.

Adjustable rear foot pads 38, 40 are positioned at the intersection of rear support bar 24 and side support bars 26, 28, respectively. Each foot pad 38, 40 includes a threaded spindle 42, backing plate 44, and elastomeric pad 46. The spindles 42 are received within respective threaded channels 48, 50.

Stair assembly 16 includes opposed pairs 52, 54 of step tread support bars pivotally coupled to side support bars 26, 28, respectively. Each pair of tread support bars includes upper bar 56 and lower bar 58 oriented parallel to each other. Step treads 60 are pivotally coupled to the upper and lower tread support bars. The handrail 20 is supported by selected step treads 60a, 60b, 60c.

Telescoping support mechanism 18 is pivotally coupled to base frame side support bars 26, 28 and stair assembly 16. Telescoping support mechanism 18 broadly includes a pair of telescoping assemblies 62, 64, and height adjustment locking mechanim 66. Each telescoping assembly 62, 64 includes a lowermost slide tube 68, and an extension tube 70 shiftably received within the slide tube 68. As best seen in FIG. 3, each extension tube 70 includes a plurality of lock pin receiving apertures 72.

The height adjustment locking mechanism 66 includes a locking pin 74 associated with each telescoping assembly 62, 64, a locking pin support weldment 76 associated with each locking pin 74, a locking actuating lever 78, and latch 80. The locking pins 74 are receivable within locking pin receiving apertures 72 of extension tubes 70.

Each locking pin 74 includes a washer 82 and a slide tube engaging spring pin 83. A biasing spring 84 is carried by each pin 74 within support weldment 76. An actuating lever engaging spring pin 86 is carried by each locking pin 74.

Locking pin actuating lever 78 includes downwardly extending pivot elements 88, 90 connected by a cross bar 92. The actuating lever engaging spring pins 86 carried by respective locking pins 74 are received through respective pivot elements 88, 90 and define the pivot element pivot axis. Latch loop 94 is carried by cross bar 92. Support bar 96 extends between slide tubes 68. Latch 80 is carried by the support bar 96. Latch 80 includes pivotal lock cam 98, supported by latch cam clevis 100.

Pneumatic spring 104 extends between the base frame 14 and stair assembly 16.

Carriage 12 broadly includes carriage first frame member 106 pivotally coupled to base frame front support bar 22, carriage second frame member 108 pivotally coupled to base frame rear support bar 24, wheel assemblies 110, 112, 114, 116, and carriage lock mechanism 118.

Carriage first frame member 106 includes opposed, parallel lever arms 120, 122. Lever arms 120, 122 are pivotally coupled to base frame front support bar 22 by clevises 124, 126, respectively, along a first pivot axis 127. Cross bar 128 rigidly connects lever arms 120, 122. Wheel assemblies 110, 112 are carried by lever arms 120, 122, respectively, each positioned an equal distance away from the first pivot axis 127. Each wheel assembly 110, 112 includes a pivotal caster 130. The free ends of lever arms 120, 122 each include an upwardly facing hook 132. A foot pedal 134 is carried by each lever arm 120, 122.

Carriage second frame member 108 includes opposed, parallel lever arms 136, 138. The lever arms 136, 138 are pivotally coupled to base frame rear support bar 24 by support clevises 140, 142 defining a second pivot axis 144. Cross bars 146, 148 pivotally interconnect carriage second frame lever arms 136, 138. Wheel assemblies 114, 116 are carried by lever arms 136, 138, respectively, an equal distance from second pivot axis 144. The wheel assemblies 114, 116 include nonpivoting casters 150.

Carriage lock mechanism 118 includes lock bar 152. Lock bar retaining collars 154, 156 are carried by second carriage frame member lever arms 136, 138, respectively. Lock bar 152 includes retaining flanges 158, 160.

Slide channels 162, 164 are carried by carriage first frame member lever arms 120, 122, respectively. Cross bar 146 of carriage second frame member includes terminal ends 166, 168 shiftably carried within channels 162, 164, respectively. Cross bar 146 defines a shiftable, third pivot axis.

In operation, the height of stair assembly 16 is adjusted by first rotating latch cam 98 upwardly to release the latch loop 94 mounted on locking pin actuating lever 78. The actuating lever 78 is then rotated upwardly, thereby retracting locking pins 74 from extension tubes 70 of telescoping assemblies 62, 64. Once the locking pins 74 are clear of the telescoping assembly extension tubes 70, the stair assembly 16 can be urged upwardly with the assistance of pneumatic springs 104. Alternatively, the stair assembly 16 can be pushed downwardly against the bias of pneumatic springs 104. The locking pin actuating lever 78 is next rotated downwardly to reinsert locking pins 74 into telescoping assembly extension tubes 70, locking the stair assembly 16 at the desired height.

Referring to FIGS. 5, 6, 7, and 8, it will be appreciated that the weight of the adjustable stairway 10 urges the carriage frame members 106, 108 and attached wheels 110, 112, 114, 116 into a raised, ground disengaging position (FIG. 8) from a lowered, ground engaging position (FIG. 6). Referring in particular to FIG. 6, the carriage frame members 106, 108 and attached wheel assemblies 110, 112, 114, 116 can be selectively locked into the lowered, ground engaging position by interposing lock bar 152 across the free ends of carriage first frame member lever arms 120, 122. The lock bar 152 is captured between the carriage first frame member lever arms 120, 122 and the retaining collars 154, 156 positioned on the carriage second member lever arms 136, 138. The upstanding hooks 132 assist in maintaining the lock bar 152 in position over the carriage first frame member lever arms 120, 122. It will be recalled that the terminal ends 166, 168 of cross bar 146 are carried within channels 162, 164 of carriage first frame member lever arms 120, 122. The overall result is locking of the wheel assemblies 110, 112, 114, 116 in the lowered, ground engaging position.

Referring to FIG. 7, the carriage is shifted to its raised position by first applying downward pressure to at least one of the foot pedals 134, to depress the upstanding hooks 132 of carriage first frame member lever arms 120, 122 below the lock bar 152. Lock bar 152 can then be slid within retaining collars 154, 156 so as to clear the carriage first frame member lever arms 120, 122. Downward pressure is then removed from foot pedals 134, allowing the carriage to be urged upwardly under the weight of the stairway 10. The stairway 10 is supported by foot pads 30, 32, 38, 40 once the wheel assemblies 110, 112, 114, 116 are urged into the raised position, as depicted in FIG. 8. The carriage can be returned to the lowered position by stepping on the foot pedals 134 so as to bring the carriage first frame member lever arms 120, 122 below the carriage second frame member lever arms 136, 138. Lock bar 152 is then slid over the tops of carriage first frame member lever arms 120, 122 and foot pedals 134 are released.

What is claimed is:

1. A portable, adjustable stairway, comprising:

a frame;

a stair assembly including first and second opposed pairs of tread support bars pivotally coupled to said frame, and a plurality of step treads extending between and pivotally coupled to said first and second pairs of tread support bars;

height adjustment means operably, pivotally coupled to said frame and to said stair assembly for shifting said stair assembly from a lowered position to a plurality of raised positions;

biasing means for urging said stair assembly away from said lowered position and into said raised positions; and a retractable wheel carriage assembly operably coupled to said frame, said retractable wheel carriage assembly including— a first carriage member operably, pivotally coupled to said frame along a first pivot axis said first carriage member including a first carriage member lever arm;

a second carriage member operably, pivotally coupled to said frame along a second pivot axis, said second carriage member including a second carriage member lever arm;

a first wheel assembly operably carried by said first carriage member spaced from said first pivot axis, and a second wheel assembly operably carried by said second carriage member spaced from said second pivot axis, whereby the weight of said stairway urges said first and second wheel assemblies from lowered, ground engaging positions below said frame to raised, ground clearing positions, and locking means for selectively locking said wheel assemblies in said lowered positions; and means operably coupling said first and second lever arms for simultaneous shifting of said first and second wheel assemblies between said lowered and raised positions, said first and second pivot axes being fixed in relative position to each other and said frame, said means operably coupling said first and second lever arms presenting a third pivot axis shiftable relative to said first and second pivot axis.

2. The invention as claimed in claim 1, said means operably coupling said first and second lever arms including structure defining a guide channel operably coupled to said first lever arm, and a guide element operably coupled to said second lever arm, said guide element being shiftably received within said guide channel.

3. The invention as claimed in claims 1 or 2, said locking means comprising means spaced apart from said third pivot axis for detachably coupling said first and second lever arms together.

4. The invention as claimed in claim 3, said means detachably coupling said first and second lever arms comprising an element carried by said second lever arm shiftable between a lock position wherein said element engages said first lever arm and a release position wherein said element clears said first lever arm.

5. A retractable wheel carriage for an equipment support frame, comprising:
- a first carriage member operably, pivotally coupled to said equipment support frame along a first pivot axis, said first carriage member including a first carriage member lever arm;
- a second carriage member operably, pivotally coupled to said equipment support frame along a second pivot axis, said second carriage member including a second carriage member lever arm;
- a first wheel assembly operably carried by said first carriage member spaced from said first pivot axis, and a second wheel assembly operably carried by said second carriage member spaced from said second pivot axis, whereby the weight of said equipment support frame urges said first and second wheel assemblies from lowered, load bearing positions below said equipment frame to raised, load disengaged positions; and
- locking means for selectively locking said wheel assemblies in said lowered positions;
- means operably coupling said first and second lever arms for simultaneous shifting of said first and second wheel assemblies between said lowered and raised positions;
- said first and second pivot axes being fixed in relative position to each other and said equipment support frame, said means operably coupling said first and second lever arms presenting a third pivot axis shiftable relative to said first and second pivot axis.

6. The invention as claimed in claim 5, said means operably coupling said first and second lever arms including structure defining a guide channel operably coupled to said first lever arm, and a guide element operably coupled to said second lever arm, said guide element being shiftably received within said guide channel.

7. The invention as claimed in claims 5 or 6, said locking means comprising means spaced apart from said third pivot axis for detachably coupling said first and second lever arms together.

8. The invention as claimed in claim 7, said means detachably coupling said first and second lever arms comprising a locking element carried by said second lever arm shiftable between a lock position wherein said locking element engages said first lever arm and a release position wherein said locking element clears said first lever arm.

9. The invention as claimed in claim 8, said locking element being shiftably carried by said second lever arm such that said locking element is shifted from said lock position to said release position when said second lever arm is depressed.

* * * * *